US011950719B2

(12) United States Patent
Solci et al.

(10) Patent No.: US 11,950,719 B2
(45) Date of Patent: Apr. 9, 2024

(54) TRAY COVERING ELEMENT

(71) Applicants: Stefano Solci, Mantova (IT); Paolo Nicola Micheligritti, Valmadrera (IT)

(72) Inventors: Stefano Solci, Mantova (IT); Paolo Nicola Micheligritti, Valmadrera (IT)

( * ) Notice: Subject to any disclaimer, the term of this patent is extended or adjusted under 35 U.S.C. 154(b) by 0 days.

(21) Appl. No.: 15/777,436

(22) PCT Filed: Nov. 16, 2016

(86) PCT No.: PCT/IT2016/000267
§ 371 (c)(1),
(2) Date: May 18, 2018

(87) PCT Pub. No.: WO2017/085750
PCT Pub. Date: May 26, 2017

(65) Prior Publication Data

US 2018/0332988 A1 Nov. 22, 2018

(30) Foreign Application Priority Data

Nov. 20, 2015 (IT) ........................ 202015000075120

(51) Int. Cl.
*A47G 23/03* (2006.01)
*A47G 23/06* (2006.01)
(Continued)

(52) U.S. Cl.
CPC ..... *A47G 23/0633* (2013.01); *A47G 23/0303* (2013.01); *B26D 3/16* (2013.01); *B26D 3/163* (2013.01); *B31D 1/04* (2013.01)

(58) Field of Classification Search
CPC ............ A47G 23/0633; A47G 23/0303; A47G 23/06; A47G 23/0306; A47G 11/003;
(Continued)

(56) References Cited

U.S. PATENT DOCUMENTS 2,531,255 A * 11/1950 Clarke ................ B65D 5/2009
229/113
3,666,604 A * 5/1972 Coffet ..................... B32B 38/06
428/81

(Continued)

FOREIGN PATENT DOCUMENTS

| | | |
|---|---|---|
| BR | 9 605 708 | 8/1998 |
| FR | 2 760 618 | 9/1998 |

OTHER PUBLICATIONS

International Search Report dated Apr. 7, 2017 is International (PCT) Application No. PCT/IT2016/000267.

*Primary Examiner* — Don M Anderson
(74) *Attorney, Agent, or Firm* — Wenderoth, Lind & Ponack, L.L.P.

(57) ABSTRACT

The invention relates to a tray covering element essentially constituted of a first portion (2), which covers the upper surface of a tray (5), in the manner of a placemat, and a second portion (3), which creates an outer edge for the first portion and which is envisaged to cover the outer and upper edge (50) of the tray. The second portion (3) comprises a third portion (30) located laterally and protruding from the edge (50) and designed to bend downwards and fold around the edge of the tray (5) and cover the lower edge so that the user does not touch the tray when holding it, only the tray covering element.

7 Claims, 2 Drawing Sheets

(51) Int. Cl.
*B26D 3/16* (2006.01)
*B31D 1/04* (2006.01)

(58) Field of Classification Search
CPC ................ A47G 11/004; A47G 11/006; A47G 2400/025; B31D 1/04; B65D 225/16
See application file for complete search history.

(56) References Cited

U.S. PATENT DOCUMENTS

| | | | | | |
|---|---|---|---|---|---|
| 5,941,408 | A * | 8/1999 | Sherman | A45C 3/04 | 220/495.01 |
| 10,077,137 | B1 * | 9/2018 | Wang | H01F 7/0252 | |
| 10,696,454 | B1 * | 6/2020 | Wang | B65D 25/2852 | |
| 2002/0160184 | A1 * | 10/2002 | Cho | A47G 23/0303 | 428/354 |
| 2004/0251255 | A1 * | 12/2004 | Azzar | B65D 1/34 | 220/23.87 |
| 2006/0088231 | A1 * | 4/2006 | Figlietti | B65D 29/00 | 383/22 |
| 2007/0051864 | A1 * | 3/2007 | Bartell | A47G 23/0633 | 248/346.01 |
| 2007/0131741 | A1 * | 6/2007 | Fransen | B65D 77/003 | 206/541 |
| 2007/0138198 | A1 * | 6/2007 | Levy | A47G 23/0303 | 206/541 |
| 2008/0029425 | A1 * | 2/2008 | Lebel | A45C 9/00 | 206/541 |
| 2009/0254429 | A1 | 10/2009 | Manor et al. | | |
| 2010/0065465 | A1 * | 3/2010 | Delgado | B65D 33/105 | 206/549 |
| 2010/0092108 | A1 * | 4/2010 | Figlietti | B65D 33/24 | 383/4 |
| 2012/0074149 | A1 * | 3/2012 | Roth | B65D 25/16 | 220/495.01 |
| 2014/0014006 | A1 * | 1/2014 | Clatterbuck | A47G 23/0303 | 108/90 |
| 2015/0173473 | A1 * | 6/2015 | Jenkins | A45C 3/04 | 190/1 |
| 2017/0027347 | A1 * | 2/2017 | Kovacs | A61L 2/10 | |
| 2019/0045957 | A1 * | 2/2019 | Patterson | B65D 43/0212 | |

* cited by examiner

TRAY COVERING ELEMENT

TECHNICAL FIELD

The present invention relates to a tray covering element which is particularly recommended for separating and insulating the tray against contact with the external environment, thereby preventing contamination of any type for the user and the food contained therein.

BACKGROUND ART

As is known, tray covers are very important and useful elements to prevent the tray getting dirty and to ensure the foods do not touch the container directly.

Currently, there exist many types of tray covers which are made of fabric, plastic, and paper, but the majority thereof, which are used in public places, are made of paper and are used in self-service restaurants, in fast food restaurants, canteens and in all settings where one consumes a meal independently and without service, such as, for example, hospitals or school and work canteens.

In the aforesaid settings, very many meals are served daily, which means the trays are reused several times during the same meal time. In actual fact, a fast-food restaurant, for example, is not equipped with enough trays to allow one for every diner throughout one meal time and, consequently, the trays are cleaned and reused immediately.

Once users have finished eating, they generally leave the tray in an appropriate container stacked on top of the other trays, after throwing the leftovers and placemat in a bin. In other cases, workers collect them from the tables and stack them up in order to bring them into the kitchens, where they are emptied and cleaned.

In order to be used again, the trays are quickly washed and sanitised. The systems currently in use for cleaning trays has brought to light a series of problems resulting in a considerable number of drawbacks.

A first drawback which has emerged is due to the fact that, the trays are often only washed on the front, not all over, which means that when they are stacked, any residues from the rear of the tray on top are transferred to the front of the tray below and so on. Similarly, since they have to be reused quickly, they are very often steam-dried, but they do not always come out perfectly dry so the difference in temperature between the place of washing and the place of use leads to the steam condensing and turning into water, which leaves the trays wet, and the water droplets on a tray can be transferred onto the tray nearby and, as said earlier, if there are any residues of dirt, food, or even detergent, these are also transferred from one tray to another, which means proper hygiene is not guaranteed for the future user. Furthermore, because of the temperature thereof, the drops of steam present are the ideal habitat for bacteria and an ideal breeding ground.

In addition, when the trays feature an edge, the latter is more difficult to clean automatically and, consequently, it is less easy to ensure an adequate and suitable level of hygiene.

Another problem encountered arises from the fact that—to ensure good balance when transporting the tray, the latter is always held in the same area, which means that in that area there is a higher bacteriological and viral concentration.

In addition to the explanations so far, the trays that are ready to be used are stacked on top of one another and if a tray is contaminated or dirty, then those located thereabove and therebelow become so also.

Moreover, when a worker hands the tray to the user, the former is unable to guarantee that it is not contaminated since it touches food, but also money. Another possibility of contamination may be caused by workers moving the trays from the kitchens to the food distribution area, since they do not use gloves. A further possibility of contamination may arise when the trays are placed on the counter prior to the distribution thereof.

In particular, when the user holds the edges of the tray, if the latter is contaminated through contact with other trays (due to the presence of residues of dirt or drops of moisture from washing), the user's hands are contaminated and, consequently, the user ingests whatever is present on the edge of the tray, since one eats with one's hands in fast-food restaurants.

In support of that outlined so far, there exist countless studies and reports that demonstrate the bacteria and traces of unsuitable substances which can be found right at the points of contact on the trays.

Nowadays paper placemats are placed on the trays, which cover the upper surface of the tray, but not the edges, which means that not all of the problems illustrated previously are avoided.

It has been found that the world of self-service and fast-food restaurants etc. is unable to protect its consumers from contamination when users are holding trays.

Confirming that which has been outlined so far, in recent times, there has been a proliferation of infectious and bacterial diseases and an increase in allergies and intolerances which were previously more limited. The aforesaid situation is annoying for an adult, but for children it can become unmanageable and extremely insidious.

In addition to the above, it is known that while loving the kind of food served by self-service and fast-food restaurants, many users are particularly careful and demanding about the ways in which the food is served, which means they are absolutely unwilling to accept a tray which is potentially contaminated and not perfectly hygienic, in addition to not being adequate and suitable for the serving of foods.

DISCLOSURE OF INVENTION

The object of the present invention is essentially to solve the problems of the known technique by overcoming the aforesaid drawbacks by means of a tray covering element which can be applied to and engages with a tray, in a simple and fast manner, which features a good covering capacity of both the surface and the edges of the tray, and is foldable outwards, around the edges, so that the user's hands do not come into contact with the said tray.

A second object of the present invention is to produce a tray covering element which offers good resistance to contamination, while also having a particularly eye-catching and attractive appearance.

A further object of the present invention is to produce a tray covering element whose appearance can be customised with various colour combinations, graphics and images and with an appearance which allows it to become an easily recognisable element of the restaurant chain which uses it.

Another object of the present invention is to produce a tray covering element which can be easily stacked, is suitably sized to be adaptable to various types of tray, is not bulky, and is—at the same time—practical and safe.

A still further object of the present invention is to produce a tray covering element which can also be easily used as a vehicle for advertising.

A still further but not final aim of the present invention is to produce a tray covering element which is easy to manufacture and works well.

These objects and others besides, which will better emerge over the course of the present description, are essentially achieved by means of a tray covering element, as outlined in the claims below.

BRIEF DESCRIPTION OF DRAWINGS

Further characteristics and advantages will better emerge in the detailed description of a tray covering element according to the present invention, provided in the form of a non-limiting example, with reference to the accompanying drawing, in which.

Figure 1:
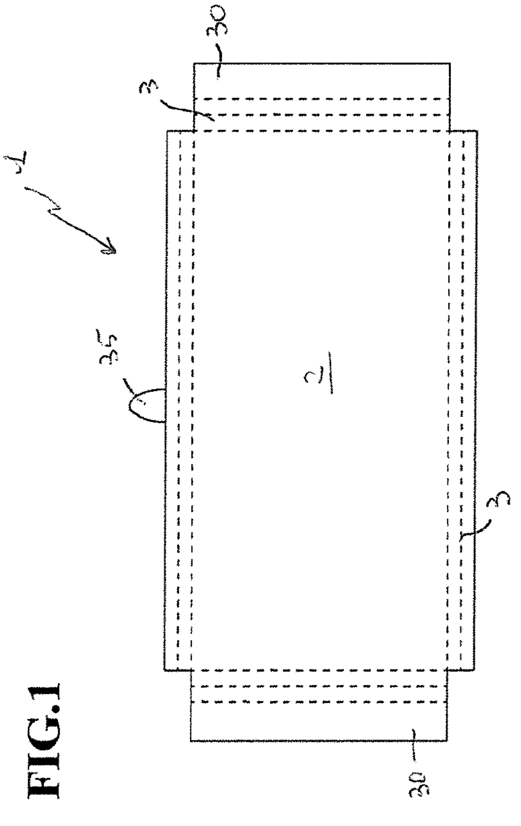
FIG. 1 shows a top-down view, presented schematically, of a tray covering element according to the present invention.

With reference to the aforesaid figures, in particular to FIG. 1, 1 is used to denote a tray covering element according to the present invention as a whole.

DETAILED DESCRIPTION OF THE INVENTION

Figure 2:
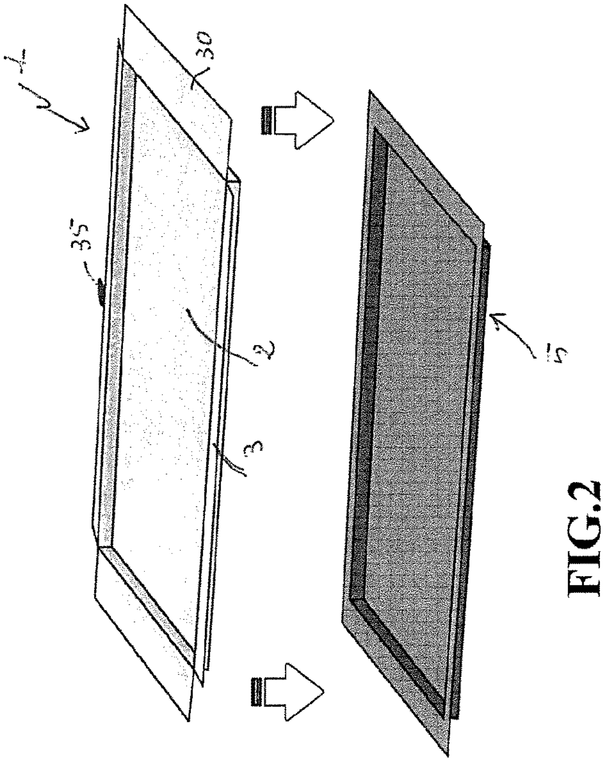
FIG. 2 shows a perspective view of the tray covering element in FIG. 1 when placed on the tray.

The tray covering element 1 in question is composed of a sheet of paper-like material or of paper- or plastic-based material which may be, but not necessarily are, suitable for food use. In particular, element 1 features an extended edge to be used as a handgrip. In more detail, the tray covering element is essentially constituted of a first portion 2, which covers the upper surface of a tray 5, like standard placemats, and a second portion 3, which creates an outer edge for the first portion and which is envisaged to cover the outer and upper edge 50 of the tray, as shown in FIG. 2.

Figures 6, 7, 8, 9, 10:
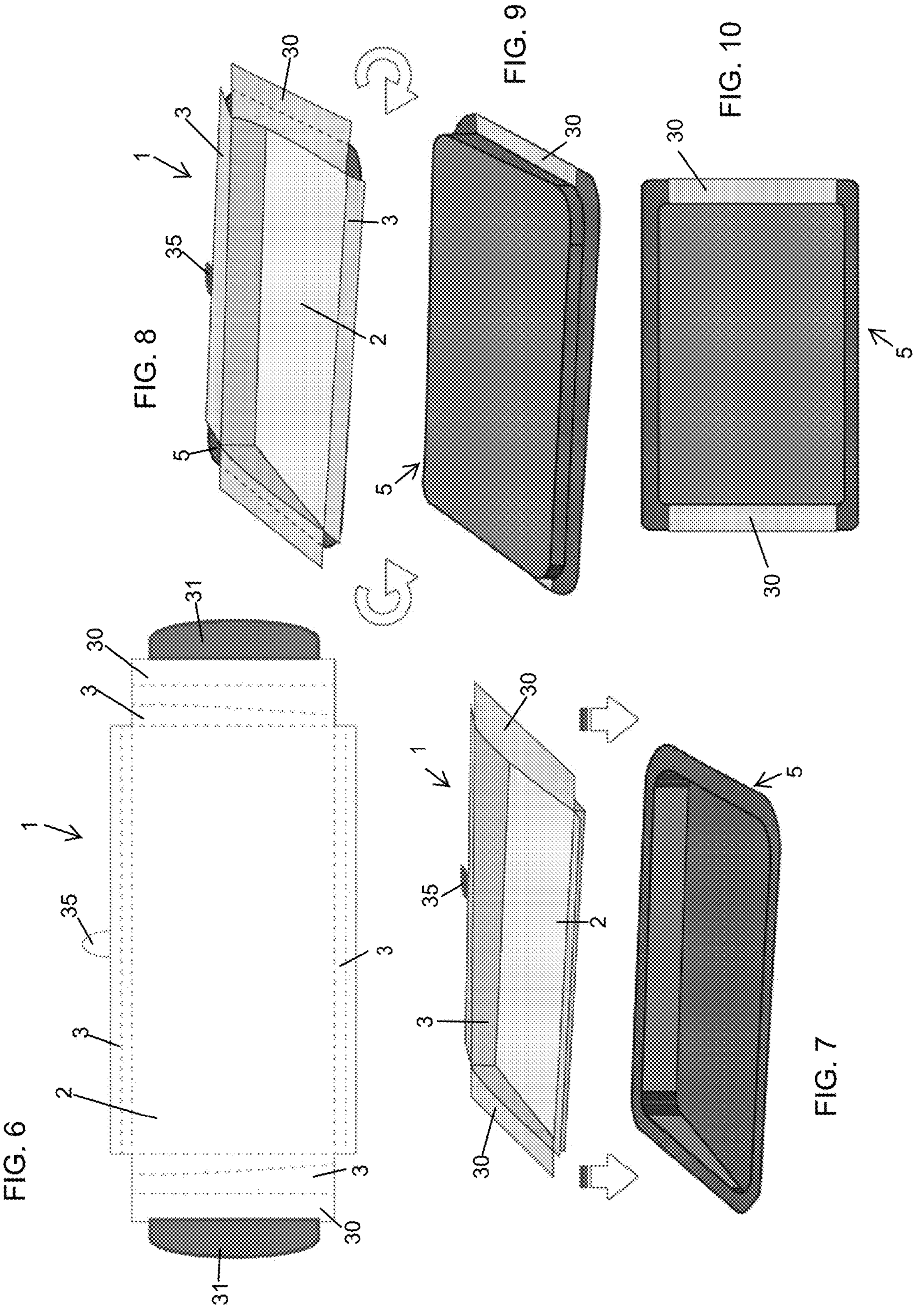
FIG. 6 shows a top-down view, presented schematically, of a variant of the tray covering element in question.
FIG. 7 shows a perspective view of the tray covering element in FIG. 6 when placed on a different type of tray.
FIG. 8 shows, schematically, the tray with the tray covering element partially positioned.
FIG. 9 shows a rear view of the tray in FIG. 7 with the tray covering element in place.
FIG. 10 shows a bottom-up view of the tray with the tray covering element.

According to the present invention, the second portion 3 may have bends or die scores included to allow the paper to be bent in order to smoothly adapt to the conformation of the tray, as shown in FIG. 6, where the tray features unusual raised edges, or bellows folds so as to be extended and adequately cover the edge 50 of the tray.

Figure 3:
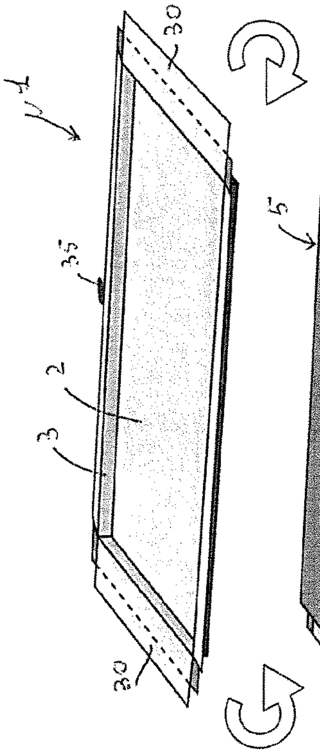
FIG. 3 shows, presented schematically, a tray with the tray covering element partially positioned.
Figure 4:
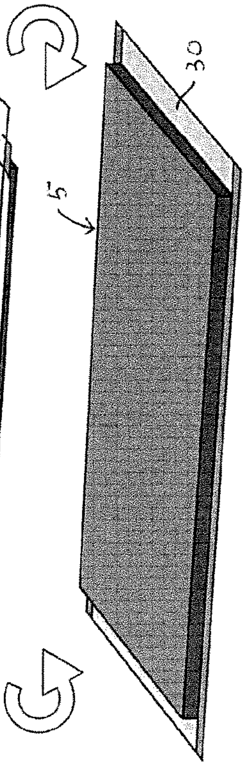
FIG. 4 shows a rear view of the tray in FIG. 3 with the tray covering element in place.
Figure 5:
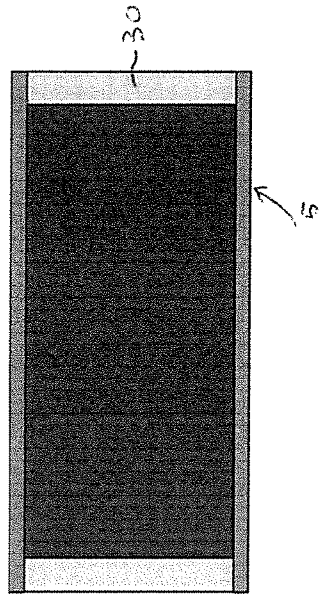
FIG. 5 shows a bottom-up view of the tray with the tray covering element.

In accordance with the present invention, the second portion 3 of the tray covering element includes a third portion 30 located laterally, as shown in FIG. 3, which protrudes from the edge 50 and can be bent downwards and folded around the edge of the tray 5 so as to cover the bottom edge, as shown in FIG. 4, so that when the user grasps the tray, the user does not touch the latter, only the tray covering element.

In particular, the third portion 30 has any configuration such as, for example, a simple protruding rectangle, as shown in FIG. 8, a semicircle, or a more complex configuration which has been processed to make it more particular and original and to allow the tray covering element to differ from one restaurant chain to another.

As mentioned earlier, the third portion 30 extends beyond the section of the lateral edge 50 and folds around the edge to cover the undersection of tray that will be occupied by the user's hands.

For example, for the McDonalds chain, the third portion 30 could take the form of a letter "M" which folds around the edge of the tray or the shape of the face of the clown which represents the chain.

In addition to that outlined so far, the third portion 30 can feature a pair of protrusions 31, positioned so as to extend the said portion, whose task is to create a proper handle so that the user can hold the tray comfortably without the risk of having to touch it.

In accordance with the present invention, the tray covering element is stackable so as to be easily pulled out by the worker and positioned on the tray, perhaps grasping it with a tab 35 in a section of the second portion which is not then touched by the customer, so as not to run the risk of contamination.

The tray covering element in question is still a practical placemat and can also be used as a vehicle for advertising if sponsored, since the menu—or anything else—can be written on the first portion and text, images, or advertisements for venues, companies, products, films, and more can be added to the second portion.

While having a low production cost, the tray covering element in question will be slightly more expensive than the placemats currently available on the market, but this slight increase would be offset by an important service offered to customers including careful hygiene and health protection.

In addition to that outlined so far, the tray covering element can be produced with a recyclable material, so as not to create any polluting waste.

After the predominantly structural description, the invention in question will now be outlined.

The tray covering element in question works like a conventional placemat; in fact, one simply places the element on the tray, in order to protect the food, positions the second portion along the edges and then folds the third portion around the lateral edges, holding the tray in the usual manner. This way, the user does not come into contact with the tray, which means the user's hands are protected from possible contamination of any type and nature.

Thus the present invention achieves the objects set.

The tray covering element in question can be applied to and engages with a tray, in a simple and practical manner, features a good covering capacity of both the surface and the edges of the tray, and is foldable outwards, around the lateral edges, so that the user's hands do not come into contact with the said tray.

Advantageously, when the user pours the leftovers into the bin, the tray covering element is much more practical and functional than the usual placemats because, by holding the third portion, the user can slide everything off better without touching the tray, even in this circumstance.

In addition, in the event that liquid is spilt inside the tray, it becomes easier to remove the tray covering element with the leftovers without having to get one's hands wet or dirty, since the user can hold the second and/or third portion, which is not wet, as it is raised with respect to the upper surface of the tray.

Advantageously, the tray covering element provides an excellent barrier to the contamination of the user's hands and, consequently, of the foods which will then be eaten. In addition, the tray covering element can have a particularly eye-catching and attractive appearance if decorated or coloured, or can act as a vehicle for the provision of information if containing text or other information.

In particular, the tray covering element can also be used as a vehicle for advertising since, on the surface thereof, it is possible to add text, images, or advertisements for venues, companies, and products. In addition, the element in question can become an element for the promotion of a film and much more.

Indeed, the tray covering element can be customised with various colour combinations, designs, or text, and can have an appearance which allows it to become an easily recognisable element of the restaurant chain which uses it. Furthermore, the element according to the present invention allows the creation of extremely customised embodiments, which can be varied any time one wishes.

In addition, the element according to the present invention is easily stacked, features a suitably size to be adaptable to various types of tray, is not bulky, and is—at the same time—practical and safe. In particular, the tray covering element—and the conformation thereof—does not require changes to the format, protocols, and procedures used with the current placemats in terms of management of the distribution of the meals.

Advantageously, the tray covering element allows a restaurant chain to demonstrate its attention to and respect for the customer, by preventing contamination thereof through contact with trays. Furthermore, the element is an object which can be customised, is innovative, and is capable of arousing interest and attention.

A further advantage is due to the fact that the tray covering element is easy to manufacture and works well.

Naturally, further modifications or variants may be applied to the present invention while remaining within the scope of the invention that characterises it.

The invention claimed is:

1. A dining tray covering element comprising:

a rectangular first portion configured to cover an upper surface of a dining tray, the rectangular first portion having first and second sides which extend in a length direction and third and fourth sides which extend in a width direction, the first and second sides being longer than the third and fourth sides; and a plurality of second portions configured to cover an outer edge and an upper edge of the dining tray, each second portion extending along a respective one of the first, second, third and fourth sides of the rectangular first portion, wherein the second portion extending along the first side and the second portion extending along the second side extend outwardly from the rectangular first portion in the width direction, wherein the second portion extending along the third side and the second portion extending along the fourth side extend outwardly from the rectangular first portion in the length direction, wherein the second portions extending along the third and fourth sides include third portions located at outer ends thereof in the length direction, respectively, the third portions being configured to protrude in the length direction from lateral outer edges of the dining tray and to bend downwards and fold around the lateral outer edges of the dining tray, respectively, in order to cover a lower edge of the dining tray so that when a user is holding the dining tray covered by the dining tray covering element, the user does not touch the dining tray and comes into contact solely with the dining tray covering element, wherein the dining tray covering element is configurable from a resting condition in which the dining tray covering element is stacked together with a plurality of other dining tray covering elements, to a first working condition in which the dining tray covering element is resting, spread out, on the dining tray, and to a second working condition in which the third portions extend beyond the lateral outer edges of the dining tray and fold around the lateral outer edges of the dining tray, respectively, to cover an undersection of the dining tray that will be occupied by the user's hands, and wherein a single tab comprising an arcuate portion is arranged so as to project, in the width direction, only from a central portion of an outermost edge of only one of the second portions extending along the first and second sides, such that the tab can be grasped by a person other than the user while positioning the dining tray covering element on the dining tray without contacting any other portion of the dining tray covering element, and wherein the tab is continuous with the only one of the second portions along the first and second sides along an entire length of the tab in the length direction.

2. The dining tray covering element according to claim 1, wherein each second portion includes bends or die-scores configured to allow a component material of the dining tray covering element to be bent in order to smoothly adapt to a conformation of the dining tray.

3. The dining tray covering element according to claim 1, wherein each third portion includes a protrusion positioned so as to extend from the third portion, so as to form a pair of handles so that the user can hold the dining tray via the handles of the dining tray covering element.

4. The dining tray covering element according to claim 1, wherein the dining tray covering element is composed of a sheet of paper, paper-based material or plastic-based material, the material being recyclable.

5. The dining tray covering element according to claim 1, wherein the dining tray covering element is stackable with other dining tray covering elements.

6. The dining tray covering element according to claim 1, wherein the dining tray covering element is a placemat which is configured to be customizable with colour combinations, designs, text, images or advertisements.

7. The dining tray covering element according to claim 1, wherein each second portion further includes bellows folds configured so as to be extended such that the second portions are adaptable to cover the outer edge of the dining tray.

* * * * *